3,681,240
RETARDED ACID EMULSION
Clarence R. Fast, Frederick H. Rixe, and Ernest L. Duffield, Jr., Tulsa, Okla., assignors to Amoco Production Company, Tulsa, Okla.
No Drawing. Filed Dec. 10, 1970, Ser. No. 97,005
Int. Cl. E21b 43/27
U.S. Cl. 252—8.55 C           8 Claims

ABSTRACT OF THE DISCLOSURE

The action of acid emulsions for use in acidizing hydrocarbon-bearing formations is prolonged by employing as the principal emulsifying agent an amine salt of dodecylbenzene sulfonic acid. Acid emulsions employing the amine salt of dodecylbenzene sulfonic acid exhibit greater stability than those employing the free acid.

The present invention relates to novel compositions for use in acidizing hydrocarbon-bearing formations. More particularly, it is concerned with retarded acid emulsions of prolonged stability, thus making it possible for the acid in this form to be displaced substantial distances out into the formation before becoming spent.

BACKGROUND OF THE INVENTION

It is well known that production of petroleum or gas from a limestone, dolomite or other calcareous-magnesium formation can be stimulated by introducing an acid into the producing well and forcing it into the oil- or gas-bearing formation. The treating acid, commonly a mineral acid such as hydrochloric acid, is capable of forming water soluble salts upon contact with the formation and is effective to increase the permeability thereof and augment the flow of petroleum to the producing well. In this connection the acid employed should be one which is capable of forming salts with calcium and/or magnesium that are soluble in water to the extent of at least about 50 grams per liter at 20° C.

One difficulty in the past which has been experienced in this field is the rapid, spontaneous action of the acid on the formation. When the acid comes into contact with the formation it is neutralized by the reaction between the acid and the calcium-magnesium components so that its reactive powers are greatly diminished before it can permeate or penetrate the formation to any substantial degree.

In the early work on acidizing processes, one of the major considerations was reducing the corrosive effect of the acid on the metal well casing, pumps, etc. Accordingly several different approaches were taken:

(1) directly inhibiting the corrosive action of the acid by using various inhibitive agents such as marcaptans, thiophenols, soluble arsenate-arsenite compounds, etc.;
(2) employing an acid-in-oil emulsion in which the aqueous acid dispersed phase is, in effect, shielded from the metal by envelopment in a hydrocarbon oil phase, or
(3) treating the well casing and other metal parts in some way; for example, by introducing a hydrocarbon oil prior to or along with the acid in the hope of coating the metal with a protective oil film.

Based on the experience of using the various processes referred to above, some of which were never commercially feasible, it became evident that the reaction rate of the acid was an important factor in increasing the producibility of the formation. This was particularly apparent when using the acid-in-oil emulsions. All other things being equal, the acid-in-oil emulsion should have a very slow reaction rate, yet the reaction time was still too short to permit extensive penetration of the well treating compositions into the formation.

It has been the common belief in the past that in order for an emulsion to exhibit retardation in acidizing processes it must be of the acid-in-oil type, where a hydrocarbon oil surrounds the acid dispersed therein and is effective in preventing the acid from contacting the formation. It is the prevalence of this belief that has probably been responsible for the prior art always moving in the direction of trying to provide more sophisticated acid retarding agents and means for stabilizing the emulsion to delay the breakdown of the continuous hydrocarbon oil phase surrounding the dispersed aqueous acid phase.

DESCRIPTION OF THE INVENTION

We have now discovered retarded acid compositions which in emulsified form exhibit a significantly retarded rate of depletion or spending of the acid so as to permit deeper penetration of etched flow channels into the producing formation. Briefly, these compositions comprise a mineral acid—preferably hydrochloric acid—capable of reacting with the formation to produce water soluble salts thereof, and an oil portion containing the emulsifier which is an amine salt of dodecylbenzene sulfonic acid. In addition to the above mentioned ingredients, we prefer to employ one of the well known corrosion inhibitors used in compositions of this kind. Preferably such inhibitor is one that exhibits surface active properties. Propargyl compounds such as those described in U.S. 3,079,345 likewise may be used. Also, compositions of the type described in U.S. 3,077,454 have been found effective inhibitors under the conditions of use contemplated herein.

In U.S. 3,353,603, retarded acid compositions are taught that somewhat resemble those of the present invention. However, these differ in one fundamental and important respect, i.e., the emulsifying agent employed. The compositions of U.S. 3,353,603 use dodecylbenzene sulfonic acid—the free acid—as the emulsifier in such compositions.

Generally speaking, the oil portion of our compositions—which may be kerosene, light crude oil, diesel oil, etc.—may be employed in an amount corresponding to about 7 to about 45 volume percent based on the volume of acid solution used. The emulsifier is employed—preferably dissolved in the oil—in an amount ranging from about 1 to about 10% based on the volume of the oil present. The corrosion inhibitor is employed preferably in a concentration corresponding to from about 0.1 to about 3% based on the volume of aqueous acid solution used.

While any mineral acid may be employed capable of forming highly soluble, i.e., to the extent of 50 grams per liter at 20° C., salts with the calcium or magnesium in the formation treated, in preparing the compositions of our invention, hydrochloric acid is generally the most practical of these acids to use. Likewise, while the concentration of acid employed in these compositions may vary widely, we ordinarily prefer to use the 15% to 28% aqueous hydrochloric acid solutions.

The emulsifier employed in preparing these acid emulsions constitutes the principal novel feature of our invention and may be prepared from dodecylbene sulfonic acid and a lower aliphatic amine, i.e., an amine having from 2–4 carbon atoms, typically a propyl amine such as isopropyl amine.

In preparing the emulsified acid compositions of our invention the inhibitor is dissolved in the acid solution and this added to a hydrocarbon solution of the emulsifier in the presence of vigorous stirring. The emulsion thus formed has a yellowish, milky appearance and is stable for extended periods of time, e.g., 10–12 hours, at temperatures of the order of 150°–175° F. These emulsions may be stored for several days at atmospheric temperature with little or no separation of the components. If some separation appears to have taken place, however, the emulsion is readily re-formed by circulation, usually of one tank volume, of the mixture in a blender.

In evaluating and comparing the emulsified acid compositions of our invention with those employing a free dodecylbenzene sulfonic acid as the emulsifier, tests were run on marble and limestone cores, 0.75-inch diameter by 1.75-inches long, shaped as right circular cylinders split along an axial plane through a diameter. This split was polished on both sides and serves as a "fracture" through which acids to be treated are displaced. The marble used was a high purity Alabama Cream marble consisting of almost pure calcite (calcium carbonate). The limestone used was a Bedford limestone of very uniform quality, obtained from a quarry in Indiana. The cores were dried, accurately weighed and then inserted in the core holder such that the "fracture" surface was horizontal to achieve uniform acid distribution, and spaced 0.01-inch apart with strips of shim stock, leaving a breadth of 0.57-inch exposed to the fluids. The holder for these cores was so designed that the fluid came into contact only with the "fracture" surface, whose area was 2.00 square inches. The core and holder were maintained at simulated formation temperatures by immersion in a heating bath.

Initially, a flow of clean kerosene was established through the "fracture" at a rate of about 5 cc./min. against 1100 p.s.i. backpressure. Then 5 cc. (35 fracture volumes) of the test acid emulsion was injected through the "fracture" at a rate of 0.5 cc./min. This gave an acid velocity of 0.5 ft./min. in the 0.01-inch "fracture." About 10 minutes were required for all of the acid to pass through the core. It was then titrated to determine its calcium content. The final weight of the core was obtained to determine the weight loss of the core. The time for one fracture volume of acid, being pumped at 0.5 cc./min., to move through the "fracture" was 0.286 minute or 17 seconds, with a velocity of 0.5 ft./min.

Results obtained in accordance with the procedure described above are reported in the table below. Triplicate runs were made at each set of test conditions. Operating conditions and composition of the emulsified retarded acid are as follows:

Acid phase: 15 weight percent hydrochloric acid plus 0.8% by volume inhibitor [1]
Oil phase: purified kerosene plus 5 volume percent emulsifier [2]
Emulsion volume ratio: 85% acid phase, 15% oil phase
Emulsion volume per test: 5.0 ml.
Flow rate: 0.50 ml./minute
Separation of split core faces: 0.01 inch

[1] The inhibitor used here is disclosed in U.S. 3,077,454.
[2] Test No. 1 used the free dodecylbenzene sulfonic acid (referred to in the table as "DBSA"); Test No. 2 used the isopropyl amine salt of dodecylbenzene sulfonic acid.

TABLE

| | Weight losses, mg.[1] | | | | |
|---|---|---|---|---|---|
| | Marble 150° F. | Marble 175° F. | Bedford limestone 150° F. | Bedford limestone 175° F. | Average |
| Test #1: DBSA | 106 | 206 | 169 | 325 | |
| | 212 | 127 | 212 | 340 | 229.9 |
| | 255 | 276 | 255 | 276 | |
| Test #2: Amine salt of DBSA | 127 | 261 | 127 | 168 | |
| | 96 | 170 | 96 | 212 | 156.1 |
| | 106 | 191 | 149 | 170 | |
| Difference | | | | | 73.8 |

[1] Weight loss calculated from calcium content of spent acid.

NOTE. $\frac{73.8}{156.1} \times 100 = 47\%$ increase in weight loss with DBSA.

The table shows that the weight loss, indicative of reaction rate, averaged 229.9 mg. for emulsions with DBSA, and only 156.1 mg. for emulsions with the composition of our invention. The difference of 73.8 mg. represents a 47% faster reaction with the DBSA emulsion. Since the distance of penetration of reactive acid is inversely proportional to its reaction rate, the emulsion composition of our invention would be expected to extend its etching effect 47% farther into the formation than the emulsion made with DBSA.

Although the individual values of weight losses in the triplicate tests show appreciable scatter, established statistical methods show that the difference of weight losses between the two compositions is much greater than could be attributed to the random errors inherent in the test method. Comparison of the standard deviation of 47.7 mg. with the difference of 73.8 mg. by an "analysis of variance" shows that there is more than 99% probability that the observed difference of the average weight loss is due to the composition of the emulsified retarded acids, and is not the result of random experimental errors.

We claim:

1. A retarded acid emulsion consisting essentially of an aqueous solution of a mineral acid whose calcium and magnesium salts are soluble in water to the extent of at least 50 grams per liter at 20° C., a corrosion inhibitor, a hydrocarbon oil in an amount ranging from about 7 to about 45 volume percent based on the volume of said acid solution and an emulsifying amount of a $C_2$ to $C_4$ alkyl amine salt of dodecylbenzene sulfonic acid.

2. The composition of claim 1 in which the acid employed is hydrochloric acid.

3. The composition of claim 1 in which the emulsifying agent is a propyl amine salt of dodecylbenzene sulfonic acid.

4. The composition of claim 3 in which the emulsifying agent is the isopropyl amine salt of dodecylbenzene sulfonic acid.

5. The composition of claim 2 in which the emulsifying agent employed is the isopropyl amine salt of dodecylbenzene sulfonic acid.

6. The composition of claim 5 wherein the hydrocarbon oil is kerosene.

7. The composition of claim 1 wherein the amine salt is present in an amount ranging from about 1 to about 10 volume percent based on the volume of the hydrocarbon oil, and the inhibitor is employed in a concentration ranging from about 0.1 to about 3.0 volume percent based on the volume of aqueous acid solution employed.

8. The composition of claim 2 in which 15% hydrochloric acid is employed.

References Cited

UNITED STATES PATENTS

| | | | |
|---|---|---|---|
| 3,353,603 | 11/1967 | Knight et al. | 166—307 |
| 2,802,531 | 8/1957 | Cardwell et al. | 252—8.55 X |
| 3,042,479 | 7/1962 | Hicks et al. | 252—172 X |
| 2,978,418 | 4/1961 | Parker | 252—353 X |
| 1,922,154 | 8/1933 | De Groote | 252—8.55 |
| 2,050,932 | 8/1936 | De Groote | 252—8.55 |

HERBERT B. GUYNN, Primary Examiner

U.S. Cl. X.R.

166—307